UNITED STATES PATENT OFFICE 2,250,176

PROCESS FOR BREAKING PETROLEUM EMULSIONS

Charles M. Blair, Jr., Webster Groves, Mo., assignor to Petrolite Corporation, Ltd., Wilmington, Del., a corporation of Delaware No Drawing. Application August 17, 1940, Serial No. 353,126

10 Claims. (Cl. 252—344)

This invention relates to the resolution of petroleum emulsions, and has for its main object to provide a novel process for resolving petroleum emulsions of the water-in-oil type, that are commonly referred to as "cut oil", "roily oil", "emulsified oil", etc., and which comprise fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude petroleum, and relatively soft waters or weak brines. Controlled emulsification and subsequent demulsification under the conditions just mentioned is of significant value in removing impurities, particularly inorganic salts, from pipeline oil.

The treating agent or demulsifier employed in my process consists of a new compound or composition of matter obtained by reaction between high molal carboxy acids, particularly detergent-forming monocarboxy acids and polyalkylene-amines containing at least three nitrogen atoms, i. e., materials of the kind exemplified by diethylene triamine, triethylene tetramine, tetraethylene pentamine, etc. These last mentioned members are commonly referred to as ethylene polyamines and are considered as members of the broad class of alkylene polyamines. Ordinarily the word "polyamine" is employed to include diamines, as well as amines having three or more nitrogen atoms. Insofar that all the compounds herein contemplated are characterized by the fact that the polyamines must contain more than two nitrogen atoms, for sake of simplicity and to avoid burdensome repetition, I will use the word "polyamine" both in the specification and in the hereto appended claims to mean polyamines having three or more nitrogen atoms, thus eliminating diamines from consideration, and eliminating from repeated use such burdensome language as "polyamine containing at least three amino nitrogen atoms."

Briefly stated, such polyamines are obtained by various reactions, but particularly by a reaction which involves ammonia and ethylene dichloride. However, instead of employing ethylene dichloride, one may emloy propylene dichloride, butylene dichloride, amylene dichloride, hexylene dichloride, octylene dichloride, and decylene dichloride, and the like, with the result that one may have present an alkylene group other than the ethylene group. My preference, however, is to employ compounds in which the alkylene group is represented by the ethylene radical. It is also to be noted that such compounds can be prepared from primary and secondary amines, as well as from ammonia, or by such amines in combination with ammonia. Furthermore, it is well known that such polyamines can be alkylated in substantially the same manner that ordinary monoamines or diamines are alkylated, for instance, treatment with an alkylene halide. Thus, any alkyl group varying from a methyl to an octadecyl group, may be introduced. Similarly, one may introduce an alicyclic group, such as a cyclohexyl group, or an aralkyl group, such as a benzyl group. It is understood that for the present purpose any hydrocarbon radical which does not alter the basic character of the amino nitrogen atom to which it is attached, is the obvious functional equivalent of an alkyl radical.

I have found that such alkylated polyamines are entirely satisfactory as a reactant for the production of the compositions of matter herein contemplated, provided that there is present at least one primary amino radical adjacent to a secondary amino radical. However, there is no limitation in regard to the presence or absence of other primary or secondary or even tertiary amino nitrogen radicals, except the molecule as a whole must contain at least three nitrogen atoms. For simplicity, the class of amines which are suitable for preparing my condensation products may be represented by the following formula:

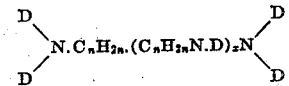

in which D stands for a hydrogen atom or an alkyl radical; $n$ stands for the numerals 1 to 10; and $x$ stands for a small number varying from 1 to 7, but preferably from 1 to 3; and there is the added proviso that there must be a primary amino group and a secondary amino group linked through a single alkylene radical. The last qualification means in essence that the following radical must appear at least once:

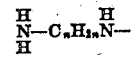

For all practical purposes I have found that the most valuable demulsifying agents are obtained by employing non-substituted ethylene polyamines of the following formula in which $x$ represents the numerals 1 to 3:

I have discovered that if an amine of the kind just described is reacted with a high molal carboxy acid or a high molal carboxy acid compound, and particularly with a detergent-forming acid or a detergent-forming acid compound, and if one continues reaction at a temperature higher than heretofore commonly employed, and if such temperature is continued for a suitable period of time, one obtains a high molal amino body which is surface-active, particularly in the form of a salt. Furthermore, such product is relatively unaffected by reaction with water in presence of an acid or a base, even though such reaction be conducted at the boiling point of the aqueous solution. Hence, such product may be considered as non-saponifiable. To be sure, long, continued treatment with concentrated alkalies or acids under severe conditions may lead to some decomposition, or hydrolysis, but the stability of these compounds, in comparison with amides, is so marked as to justify referring to them as being saponification and hydrolysis-resistant. The general nature of these new products may be illustrated in the following manner:

If one indicates a high molal carboxy acid by R.COOH and if one selects diethylene triamine as an example of a suitable polyamine, then the first reaction between these two compounds may be indicated in the following manner, i. e., with the formation of a salt or "soap":

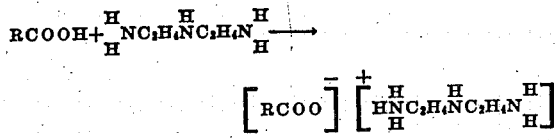

It is to be noted that neutralization or salt formation is indicated as involving the primary amine radical. Needless to say, alternately the reaction might involve the secondary amine radical, although this is immaterial.

If a soap or salt of the kind above described is then heated above the boiling point of water, for instance, anywhere in the temperature range of approximately 140 to 250° C., one obtains an amide. An amide formation may be indicated thus:

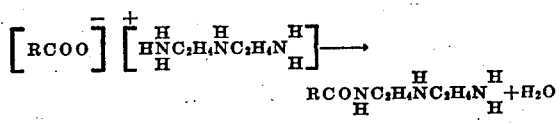

It is again to be noted that amidification may involve a secondary amino radical. This point again is immaterial.

Both of the products above described have a common characteristic: Instability toward acid. If the salt is reacted with an acid, for instance, hydrochloric acid, then the carboxy acid indicated by RCOOH is regenerated and one also forms a hydrochloride of the amine, to wit, diethylene triamine hydrochloride. Similarly, if one adds hydrochloric acid to the amide in the presence of water and boils under a reflux condenser, decomposition takes place with the formation of the carboxy acid RCOOH and the amine hydrochloride, as previously described. An alkali, such as caustic soda will also act as a hydrolyzing agent, particularly if present in an amount more than sufficient to combine with any carboxy acid which may be generated. The result of such hydrolytic procedure is the formation of the sodium salt of the carboxy acid and the free amine. This is manifestly saponification.

If, however, after forming the amide at a temperature somewhere between 140° C. and possibly as high as 250° C., but usually not above 200-220° C. as a peak, one then heats such product at a higher range, approximately 250° C. to 280° C., or higher, say, possibly, up to 300° C., or even 310 C., for a suitable period of time, for instance, 2-3 hours, one can recover the equivalent of a second mole of water for each mole of carboxy acid employed; and the product so obtained after the evolution of a second mole of water has entirely different charactertistics than either an amine salt or an amide. For instance, this difference may be exemplified by the fact that the product so obtained is stable in the presence of acid or alkali and cannot be hydrolyzed or saponified, even when an aqueous solution is boiled in the presence of an acid or alkali. This inherently different property makes the material particularly adaptable for numerous purposes, which will be hereinafter described.

I do not know the composition of this new product or products so obtained. There is no reason to believe that there is alteration or change in the hydrocarbon or hydroxylated hydrocarbon radical which is part of the acyl radical of the carboxy acid or carboxy acid compound employed. This may be illustrated in the following manner:

in which RC is a residue derived from the acid RCOOH, and the three residual valences which necessarily must be present due to the elimination of the two oxygen atoms, are satisfied by Z, in which Z is a radical of unknown composition derived from diethylene triamine, or any other polyamine of the kind described which entered into the reaction. Sometimes during such reaction there may be evolved some slight amount of ammonia or a volatile amine. However, there is no molal relationship between the amount of ammonia of volatile amine evolved, and equally good results are obtained when one cannot detect the evolution of any ammonia or volatile amine. Thus, to the extent that such evolution of ammonia or volatile amine is concerned, it appears to be in the nature of a side reaction, and possibly an undesirable side reaction.

It is to be noted that the reaction or reactions involved are in all likelihood concerned with the formation of an amide as an intermediate step. Possibly, in such instances where the mixtures of reactants are immediately raised to a temperature of approximately 280° C., or thereabouts, then materials of the kind herein contemplated are formed without the necessity of amide formation; but for all practical purposes, it is entirely satisfactory to contemplate the reaction as involving an amide as an intermediate product. This being true, it is obvious that one need not employ an acid, but that any acid compound containing the selected acyl radical may be employed. For instance, an ester, acyl chloride, anhydride, or amide might be employed with the evolution of an alcohol, halogen hydride, ammonia, or the like, in the amidification step. This is comparable to the formation of the amide of a monoamine or diamine, and does not require further elaboration. Thus, it becomes obvious that in the manufacture of the reagents of the kind herein contemplated, one may use an ester and particularly a naturally-occurring ester, such as a glyceride, instead of a fatty acid. There is no advantage in employing an acyl chloride; and in fact, such reactant is expensive and involves the formation of hydrochloric acid, which may be objectionable, since it combines with the amine to form a hydrochloride. Similarly, the use of an amide to form a higher boiling amide involves an unusually expensive reactant, and would not ordinarily be employed. The anhydrides are usually more expensive than the acids. Thus, for all practical purposes, the compositions of matter of the kind herein employed would involve the use of either the acid itself or the ester, particularly a naturally-occurring glyceride.

In the hereto appended claims, all reference to the use of an acid are intended to include the obvious functional equivalents of the kind which have been enumerated. It is understood, particularly, that the expression "fatty acid" in the hereto appended claims includes within its scope the various esters, for instance, esters of monohydric alcohols, as well as polyhydric alcohols; and thus, it is particularly intended to include the glycerides.

The ordinary reactions of the kind most commonly described in the literature are concerned with salt formation and amidification. In the latter instance, the reaction involves the removal of the monovalently linked oxygen atom, and not the divalently linked carbonyl oxygen atom; whereas, the present instance is concerned with a reaction which is essentially concerned with the removal of the divalently linked carbonyl oxygen atom.

It is to be noted in this connection that more than one acyl radical can react with a single polyamine, provided that there is at least one primary amino radical linked to a secondary amino radical through a single alkylene radical, for each radical introduced. This means that two acyl radicals, or more exactly, two acyl radical residues, i. e., the radicals RC derived from RCOOH, can be introduced into triethylene tetramine, tetraethylene pentamine, penta ethylene hexamine, and the like.

The expression "higher molecular weight carboxy acids" is an expression frequently employed to refer to certain organic acids, particularly monocarboxy acids, having more than 6 carbon atoms, and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils, such as those mentioned; hydroxy and alpha-hydroxy higher carboxylic aliphatic and fatty acids, such as dihydroxystearic acid, dihydroxy palmitic acid, dihydroxybehenic acid, alphahydroxy capric acid, alphahydroxystearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; aralkyl and aromatic acids, such as benzoic acid, Twitchell fatty acids, naphthoic acid, carboxydiphenyl pyridine carboxylic acid, hydroxybenzoic acid, blown oils, blown oil fatty acids and the like.

Other suitable acids include phenylstearic acid, benzoylnonylic acid, campholic acid, fencholic acid, cetyloxybutyric acid, cetyloxyacetic acid, chlorstearic acid, etc.

The condensation of polyamines of the kind described with monobasic carboxy acid compounds may be carried out by simply heating the two components at a high temperature, usually above 250° C., until the reaction is complete, i. e., a carbonyl oxygen atom has been removed in the manner previously indicated. As has been indicated, the upper temperature range is in the approximate neighborhood of 300° C. The actual temperature at which the reaction takes place depends upon a number of factors, for instance, the nature of the material forming the reaction vessel, whether or not a vacuum has been employed, whether or not an inert gas is blown through the reacting mass during the operation, etc. In some cases organic solvents or diluents which do not react with either of the initial substances, or with the final products, may be advantageously added. In order to illustrate operative conditions, particularly operating conditions employing glass-lined reacting vessels and employing atmospheric pressure, attention is directed to the following examples:

*Example 1*

215 g. of commercial oleic acid and 165 g. of triethylene tetramine were heated while stirring in a glass flask which carried a condenser and water trap. The temperature was held at 190–200° C. for 1 hour, after which time the evolution of water had ceased. Analysis of the trap contents showed it contained 13 g. of water. The temperature was then raised to 260° C., where the evolution of water again became apparent. The mixture was held at 260° to 300° C. for 5 hours. The total water evolved during the reaction was found to be 25.3 g., or just slightly less than 2 moles per mole of oleic acid in the starting materials.

The product was a thin oil, dispersible in water to form a paste, and clearly soluble in dilute acids to form soapy solutions of low surface tension.

The product remained soluble and soapy in dilute acids, even after refluxing for 6 hours in 10% alcoholic KOH.

Example 2

214 g. of stearic acid and 165 g. of triethylene tetramine were treated while stirring in a glass flask in an oil bath at 180–220° C. After 1 hour's heating about 13 g. of water had been evolved, and evolution of water had ceased. The temperature was then raised to 270–288° C. and held for 5 hours, during which time about 14 g. additional water were evolved.

The product was a brownish-yellow paste, soluble in dilute acetic acid to form a clear, foamy solution, and partly soluble in dilute and 15% HCl.

Example 3

210 g. of tetraethylene pentamine were substituted for the triethylene tetramine in Example 2. The period of heating and the temperature employed were almost the same as in Example 2. 26.5 g. of water were evolved. The product was similar in properties to that obtained in the previous example, except that it was somewhat more soluble in HCl solutions.

Example 4

225 g. of castor oil and 165 g. of triethylene tetramine were heated and stirred in an apparatus, as described in Example 1. After 3 hours' heating at 200–240° C., only 2 ml. of water had evolved. The product at this point was partly soluble in water and soluble in dilute acids, but was rapidly hydrolyzed on treatment with concentrated acids or alkalies. The temperature was raised to 255–275° C., and held for 7 hours, during which time 12.2 g. more water were evolved. The product was a clear red oil, soluble in dilute and concentrated acids and dispersible in water.

Example 5

225 g. of tung oil and 165 g. of triethylene tetramine were heated while stirring in a glass apparatus, as described in Example 1. The temperature was held at 200–255° C. for 2 hours, after which time 3 g. of water had been evolved. The product at this point was dispersible in water and dilute acids, but was easily hydrolyzed by warm mineral acids to give insoluble products. The temperature was then raised to 260–284° C. and held for 6 hours. 12.8 g. more of water were evolved during this period, giving a total of 14.8 g. of water. This was somewhat more than theory for one mole of water per tung oil carboxy acid radical. The greater part of this water was given up at temperatures above 275° C.

The final product was a clear red oil, dispersible in water to form a soapy, viscous mixture, and clearly soluble in dilute acids, as well as in 15% hydrochloric acid.

Example 6

450 g. of castor oil and 430 g. of tetraethylene pentamine were heated during stirring in an iron pot, loosely covered with an iron lid having two small holes through which the stirrer and thermometer passed. The mixture was quickly heated to a temperature of 200° C. and held between 200–220 for 3 hours. The product at this point was temporarily soluble in dilute acids, but was easily hydrolyzed by warm mineral acids. The mixture was then heated to 245° C. and held between 245° and 255° C. for 2½ hours. The final product, weighing 775 g., had properties very similar to the product of Example 4.

Example 7

Refined soyabean oil was substituted for castor oil in Example 6. The same procedure of this designated example was followed.

Example 8

Diethylene triamine was substituted for tetraethylene pentamine in Example 6. The method given in that example was employed.

Example 9

300 g. of castor oil and 100 g. of tetraethylene pentamine were heated and stirred in an apparatus, as described in Example 1. After 1 hour's heating at 200–240° C., 3 ml. of water had been evolved. The temperature was then raised to 267–296° C. and held for 2 hours, during which time 16 ml. additional water was evolved.

The product in the flask was a dark red oil, soluble in dilute acids, and partly soluble in 15% hydrochloric acid.

Example 10

300 g. of crude soyabean oil and 190 g. of tetraethylene pentamine were heated and stirred in an apparatus, as described in Example 1. After 1 hour's heating at 200–240° C., 4 ml. of water had been evolved. The temperature was then raised to 260–280° C. and held for 4 hours, during which period 15.2 ml. additional water was evolved.

The product was a red oil, soluble in dilute acids and partly soluble in concentrated mineral acids.

I have found that the most important exemplification of the present invention is concerned with derivatives in which the group RCO is furnished by an unsaturated fatty acid, or a naturally-occurring glyceride, which consists of a mixture of esters of unsaturated acids, for example, castor oil, soyabean, linseed, teaseed, olive oil, cottonseed oil, etc., and with the added proviso that only one radical be introduced into the polyamine, and with the added proviso that there be present at least 4, and preferably not more than 6, nitrogen atoms in the polyamine used as a raw material. My preference is to employ tetraethylene pentamine. Furthermore, in this preferred type, it is most desirable to use an unsubstituted polyamine, for instance, a polyamine free from any alkyl radicals or the like. Compounds of this type have such unusual effectiveness as demulsifiers and have such remarkable surface-active properties, particularly in the form of salts, such as the acetates, butyrates, citrates, lactates, tartrates, and the like, that the group or class may be considered as an invention within an invention.

The compounds herein described appear to react chemically like amines or polyamines, and may therefore, be employed like ordinary amines in many syntheses. Thus, the said compounds may have value as intermediates for the manufacture of other materials of a somewhat more complicated structure. For instance, a reactant derived from triricinolein, and tetraethylene pentamine might be reacted further with some other reagent, such as acetic anhydride, phthalic anhydride, or the like to produce some further or additional derivative. Condensation of the present products with chloracetic acid or the like yields unusual compounds of an amphoteric character.

One example of a simple derivative is an amide derived from materials of the kind herein contemplated. For instance, tetraethylene pentamine may be reacted with ricinoleic acid to produce a compound of the type herein contemplated. The temperature so employed varies somewhat, but would be roughly in the range of 250–300° C., depending upon the conditions of manufacture, as previously indicated. Such a product would then be cooled down to the range ordinarily employed for amidification, for instance, 140–180° C., and another mole of ricinoleic acid added and the reaction mass held at such amidification temperature until an amide is formed. Thus, the amido derivative would represent an instance where compounds of the type herein contemplated are employed as raw materials.

However, my present invention is restricted to the use of the compounds or materials herein described as demulsifiers for water-in-oil emulsions, and more specifically, emulsions of water or brine in crude petroleum.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

The demulsifer herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

I am aware that the type of compound herein described is reactive towards polybasic carboxy acids, and particularly their anhydrides, such as phthalic anhydride, so as to yield resinous or sub-resinous materials. Such reaction involves an alcoholiform hydroxyl radical derived from an acyl radical originally attached to a hydroxylated fatty acid compound, for instance, the radical OHR of what was originally OH.RCO, corresponding to a hydroxystearyl radical; or else, such reaction with phthalic anhydride or the like may involve an amino hydrogen atom. I have found that the sub-resinous materials so obtained, i. e., by reaction between phthalic anhydride or the like and materials of the kind herein contemplated, represent new compositions of matter, and in substantially all instances are adapted to the self-same purposes herein indicated in regard to the new material or compound employed as the demulsifier of my improved process for resolving petroleum emulsions.

In view of the fact that the nature of the compounds herein described cannot be defined in terms of their ultimate composition, it is to be noted that of necessity one must resort in part to the method of manufacture for a means of characterizing the same.

It is interesting to note that the higher temperatures sometimes employed in the reactions described is approximately that used for the dehydroxylation of ricinoleic acid or esters thereof to produce octadecadiene 9-11,acid-1. For this reason, when castor oil is used, and when the reaction temperature is raised to about 300° C. or above, it may happen that at least part and perhaps all of the ricinoleic acid is converted into octadecadiene 9-11,acid-1; and the radical which has previously been indicated by RC≡ in this instance represents a radical corresponding to the diene acid, rather than the hydroxy acid. Where such dehydroxylation occurs, an additional mole of water, per acyl group, is evolved.

The hereto attached claims are intended to include the variation in type where more than one mole of amine is used for each mole of high molal acid compound; for instance, the compound made by reacting two moles of tetraethylene pentamine with one mole of stearic acid.

Reference in the claims to high molal carboxy acid compounds as reactants, is also intended to include blown fatty oils and blown oil fatty acids, such as blown rapeseed oil, blown castor oil, blown linseed oil, blown soyabean oil fatty acids, and the like.

Having thus described my invention, what I claim as new and desire to secure by Letters Patent is:

1. A process for breaking petroleum emulsions of the water-in-oil type, characterized by subjecting the emulsion to the action of a demulsifier comprising a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, a high molal monocarboxy amidification-reactive compound containing as a part thereof an acyl radical having not less than 8 carbon atoms and not more than 32 carbon atoms, the ratio of said reactants being such that not more than 2 moles of the monocarboxy compound are employed per mole of polyamine, and in any event so that there is present at least one primary amino radical linked through an alkylene radical to a secondary amino group for each mole of monocarboxy compound employed; said reaction being conducted at a temperature in excess of 250° C., and under such conditions so as to cause the elimination of all carbonyl oxygen atoms with the formation of a saponification and hydrolysis-resistant, cation-active compound.

2. A process for breaking petroleum emulsions of the water-in-oil type, characterized by subjecting the emulsion to the action of a demulsifier comprising a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, an amidification-reactive, detergent-forming acid compound; the ratio of such reactants being such that not more than 2 moles of the detergent-forming acid are employed per mole of polyamine, and in any event so that there is present at least one primary amino radical linked through an alkylene radical to a secondary amino group for each mole of detergent-forming acid employed; said reaction being conducted at a temperature in excess of 250° C., and under such conditions so as to cause the elimination of all carbonyl oxygen atoms with the formation of a saponification and hydrolysis-resistant, cation-active compound.

3. A process for breaking petroleum emulsions of the water-in-oil type, characterized by subjecting the emulsion to the action of a demulsifier comprising a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, an amidification-reactive, higher fatty acid compound containing as a part thereof an acyl radical having not less than 8 and not more than 32 carbon atoms, the ratio of such reactants being such that not more than 2 moles of the higher fatty acid are employed per mole of polyamine, and in any event so that there is present at least one primary amino radical linked through an alkylene radical to a secondary amino group for each mole of higher fatty acid employed; said reaction being conducted at a temperature in excess of 250° C., and under such conditions so as to cause the elimination of all carbonyl oxygen atoms with the formation of a saponification and hydrolysis-resistant, cation-active compound.

4. A process for breaking petroleum emulsions of the water-in-oil type, characterized by subjecting the emulsion to the action of a demulsifier comprising a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, an amidification-reactive, higher unsaturated fatty acid compound containing as a part thereof an acyl radical having not less than 8 and not more than 32 carbon atoms; the ratio of such reactants being such that not more than 2 moles of the higher unsaturated fatty acid are employed per mole of polyamine, and in any event so that there is present at least one primary amino radical linked through an alkylene radical to a secondary amino group for each mole of higher unsaturated fatty acid employed; said reaction being conducted at a temperature in excess of 250° C., and under such conditions so as to cause the elimination of all carbonyl oxygen atoms with the formation of a saponification and hydrolysis-resistant, cation-active compound.

5. A process for breaking petroleum emulsions of the water-in-oil type, characterized by subjecting the emulsion to the action of a demulsifier comprising a chemical compound derived by a heat reaction involving, on the one hand, an alkylene polyamine containing at least 3 and not more than 9 amino nitrogen atoms, and in which the alkylene group contains not over 10 carbon atoms, and in which there is present at least one primary amino radical linked to a secondary amino radical through an alkylene radical; and on the other hand, an amidification-reactive, higher unsaturated fatty acid compound containing as a part thereof an acyl radical having not less than 8 and not more than 32 carbon atoms; the ratio of such reactants being in the proportion of one mole of higher unsaturated fatty acid per mole of polyamine; said reaction being conducted at a temperature in excess of 250° C., and under such conditions so as to cause the elimination of the carbonyl oxygen atom with the formation of a saponification and hydrolysis-resistant, cation-active compound.

6. A process for breaking petroleum emulsions of the water-in-oil type, characterized by subjecting the emulsion to the action of a demulsifier comprising a chemical compound derived by a heat reaction involving, on the one hand, an ethylene polyamine containing at least 3 and not more than 9 amino nitrogen atoms, in which there is present at least one primary amino radical linked to a secondary amino radical through an ethylene radical; and on the other hand, an amidification-reactive, higher unsaturated fatty acid compound containing as a part thereof an acyl radical having not less than 8 and not more than 32 carbon atoms; the ratio of such reactants being in the proportion of one mole of higher unsaturated fatty acid per mole of polyamine; said reaction being conducted at a temperature in excess of 250° C., and under such conditions so as to cause the elimination of the carbonyl oxygen atom with the formation of a saponification and hydrolysis-resistant, cation-active compound.

7. A process for breaking petroleum emulsions of the water-in-oil type, characterized by subjecting the emulsion to the action of a demulsifier comprising a chemical compound derived by a heat reaction involving, on the one hand, an ethylene polyamine containing at least 4 and not more than 6 amino nitrogen atoms, in which there is present at least one primary amino radical linked to a secondary amino radical through an ethylene radical; and on the other hand, an amidification-reactive, higher unsaturated fatty acid compound containing as a part thereof an acyl radical having not less than 8 and not more than 32 carbon atoms; the ratio of such reactants being in the proportion of one mole of higher unsaturated fatty acid per mole of polyamine; said reaction being conducted at a temperature in excess of 250° C., and under such conditions so as to cause the elimination of the carbonyl oxygen atom with the formation of a saponification and hydrolysis-resistant, cation-active compound.

8. A process for breaking petroleum emulsions of the water-in-oil type, characterized by subjecting the emulsion to the action of a demulsifier comprising a chemical compound derived by a heat reaction involving, on the one hand, an ethylene polyamine containing at least 4 and not more than 6 amino nitrogen atoms, in which there is present at least one primary amino radical linked to a secondary amino radical through an ethylene radical; and on the other hand, an amidification-reactive ricinoleic acid compound; the ratio of such reactants being in the proportion of one mole of ricinoleic acid per mole of polyamine; said reaction being conducted at a temperature in excess of 250° C., and under such conditions so as to cause the elimination of the carbonyl oxygen atoms, with the formation of a saponification and hydrolysis-resistant, cation-active compound.

9. A process for breaking petroleum emulsions of the water-in-oil type, characterized by subjecting the emulsion to the action of a demulsifier comprising a chemical compound derived by a heat reaction involving; on the one hand, an ethylene polyamine containing at least 4 and not more than 6 amino nitrogen atoms, in which there is present at least one primary amino radical linked to a secondary amino radical through an ethylene radical; and on the other hand, ricinoleic acid; the ratio of such reactants being in the proportion of one mole of ricinoleic acid per mole of polyamine; said reaction being conducted at a temperature in excess of 250° C., and under such conditions so as to cause the elimination of the carbonyl oxygen atom with the formation of a saponification and hydrolysis-resistant, cation-active compound.

10. A process for breaking petroleum emulsions of the water-in-oil-type, characterized by subjecting the emulsion to the action of a demulsifier comprising a chemical compound derived by a heat reaction involving one mole of tetraethylene pentamine and one mole of ricinoleic acid; said reaction being conducted at a temperature in excess of 250° C., and under conditions so as to cause the elimination of the carbonyl oxygen atom with the formation of a saponification and hydrolysis-resistant, cation-active compound.

CHARLES M. BLAIR, Jr.